United States Patent [19]
Hodor et al.

[11] Patent Number: 4,789,236
[45] Date of Patent: Dec. 6, 1988

[54] STRESS SENSOR

[75] Inventors: Jim R. Hodor, San Jose; Jesus Barney, Sunnyvale; Herman J. Decker, Los Altos Hills, all of Calif.

[73] Assignee: Lockheed Missiles & Space Company, Inc., Sunnyvale, Calif.

[21] Appl. No.: 894,181

[22] Filed: Aug. 7, 1986

[51] Int. Cl.$^4$ .............................................. G01B 11/18
[52] U.S. Cl. ...................................... 356/33; 356/367; 73/800; 73/850
[58] Field of Search ..................... 356/30, 32, 33, 34, 356/35, 365, 364, 366, 367, 368, 369, 370; 73/800, 850

[56] References Cited

U.S. PATENT DOCUMENTS

| | | | |
|---|---|---|---|
| 3,034,344 | 5/1962 | Zandman et al. | 356/34 |
| 3,101,609 | 8/1963 | Redner | 356/34 |
| 3,902,805 | 9/1975 | Redner | 356/35 |
| 4,570,173 | 2/1986 | Anthony et al. | 357/30 D |
| 4,585,348 | 4/1986 | Chastang | 356/369 |
| 4,629,323 | 12/1986 | Matsumoto | 356/365 |

FOREIGN PATENT DOCUMENTS 974113 11/1982 U.S.S.R. ................. 356/33

Primary Examiner—Richard A. Rosenberger
Attorney, Agent, or Firm—John J. Morrissey

[57] ABSTRACT

Mechanical stress applied to a crystal (10) by a procedure for forming a bond (13) between an electrical connector (12) and a metallized surface (11) of the crystal (10) is measured to obtain a quantitative indication of the quality of the bond (13). A beam of optical radiation generated by an illuminator (21) is divided by a first beamsplitter (22) into a first component and a second component. The power of the first component is measured by a first detector (23). The second component is circularly polarized by a circular polarizer (24), collimated by an imaging lens (25), and directed as an incident beam along an optical path through the crystal (10) to the metallized surface (11) in the vicinity of the bond (13). The metallized surface (11) reflects the incident beam back along the same optical path as a return beam. Mechanical stress applied to the crystal (10) by the bonding procedure produces birefringence in the crystal (10), which changes the polarization of the incident and return beams from circular to elliptical in passing through the crystal (10). The circular polarizer (24) functions as an analyzer with respect to the return beam, and transmits only a linearly polarized component of the return beam. A portion of the linearly polarized component of the return beam is transmitted through the first beamsplitter (22) to a second beamsplitter (26), which reflects a further portion thereof to a second detector (29), and which transmits another portion thereof to a video camera tube (27). The second detector (29) measures the power of the linearly polarized component of the return beam. A ratiometer (30) compares the power of the linearly polarized component of the return beam with the power of the first component of the beam generated by the illuminator 21, and produces a numerical value that provides a quantitative measure of the strength of the bond (13).

17 Claims, 3 Drawing Sheets

FIG_1
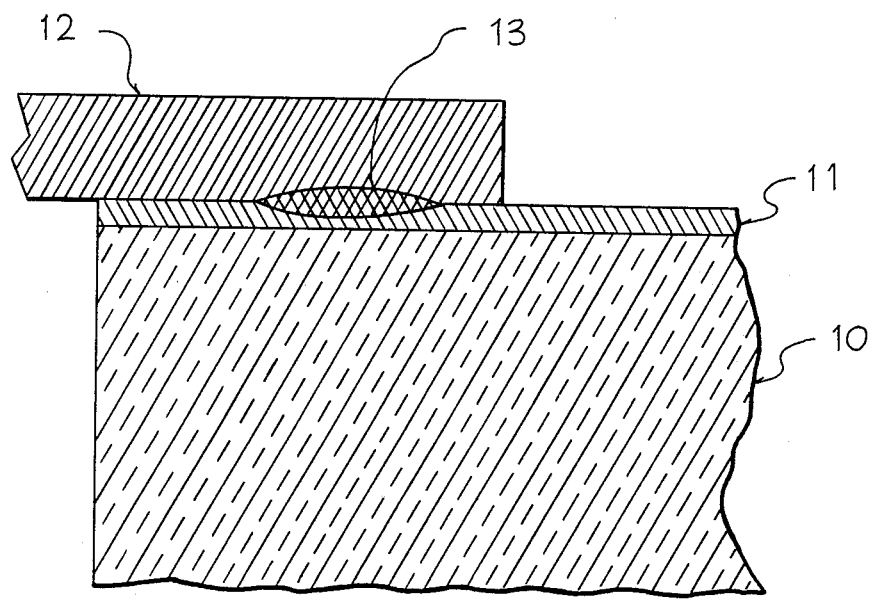

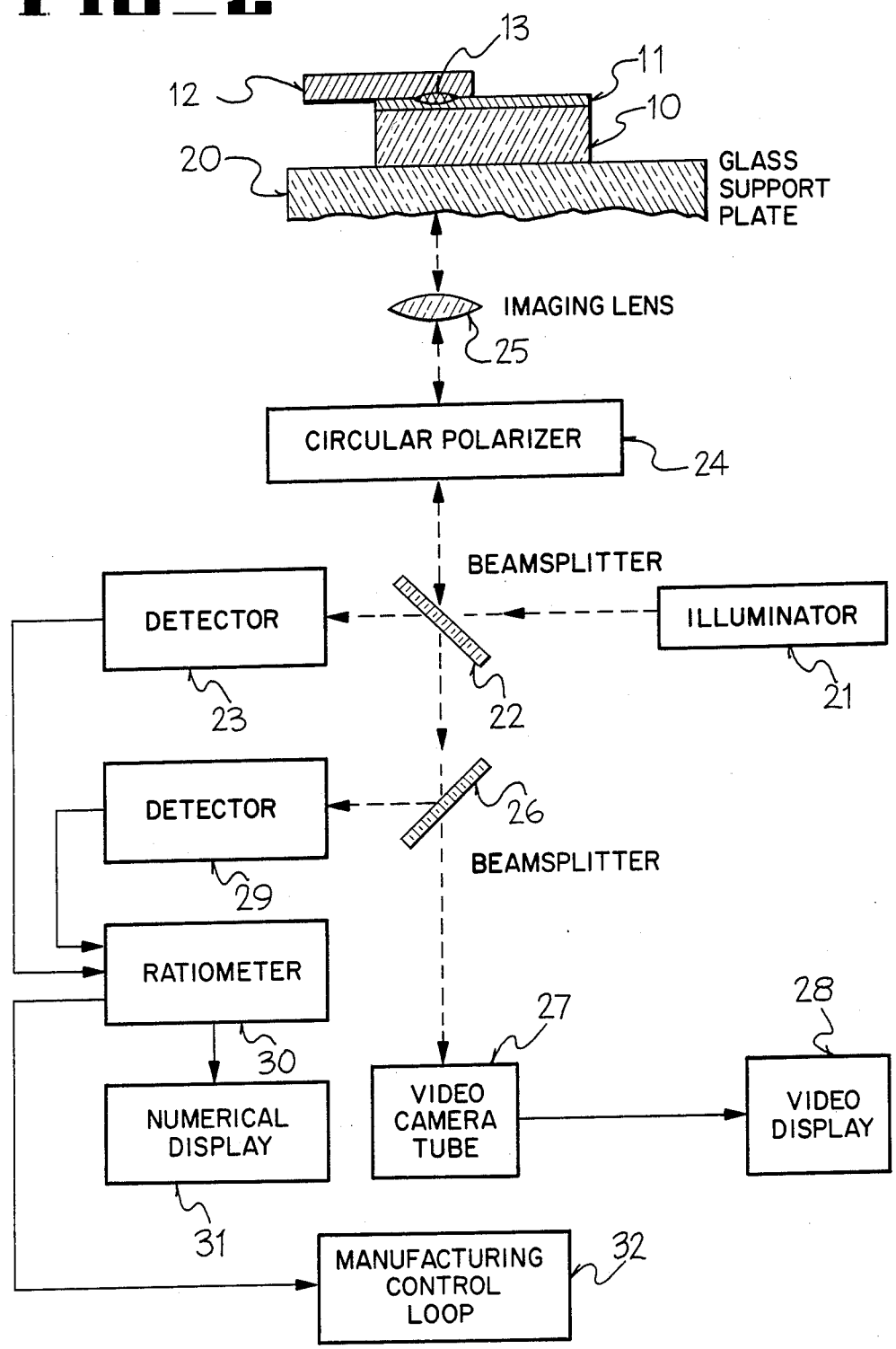

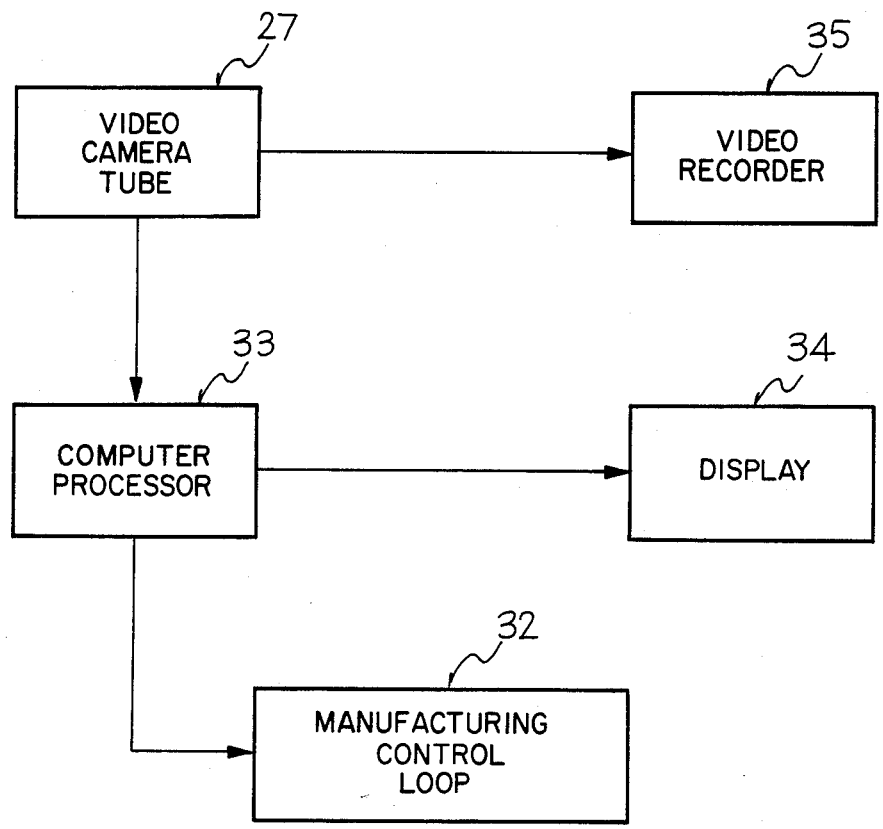
FIG_3

STRESS SENSOR

TECHNICAL FIELD

This invention relates generally to the measurement of stress applied to an optically transmissive material. More particularly, this invention relates to a technique for determining the strength of a bond connecting an electrical connector to a metallized surface on an optically transmissive crystal.

BACKGROUND OF THE INVENTION

A need has been recognized in industry for a standardized non-destructive technique that is readily adaptable to automated manufacturing processes, whereby the strength of a bond connecting an electrical connector to a metallized surface on a crystal can be precisely measured.

A specific need has arisen in the semiconductor industry with respect to the manufacture of silicon solar cell arrays for a non-destructive, non-contact technique to measure the strength of weldments that bond electrical connectors (typically copper tabs) to a metallized surface (typically a surface upon which successive layers of metals such as, e.g., aluminum, palladium, titanium and silver, are plated or deposited by vapor deposition or sputtering) on a silicon crystal.

SUMMARY OF THE INVENTION

It is an object of the present invention to provide a non-destructive, non-contact technique whereby stress applied to an optically transmissive material can be measured in terms of an effect due to birefringence produced in the material by the stress.

It is a particular object of the present invention to provide a non-destructive, non-contact technique for determining the strength of a bond connecting an electrical connector to a metallized surface of a crystal by measuring the stress that is applied to the crystal in the vicinity of the bond due to the formation of the bond.

It is likewise a particular object of the present invention to provide a non-destructive, non-contact technique that is readily adaptable to automated manufacturing processes, whereby the strength of weldments bonding electrical connectors to metallized surface portions of crystal devices such as solar cells can be inspected during manufacture.

The present invention takes advantage of the fact that when a mechanical stress is applied to a crystal, as occurs when an electrical connector is metallurgically bonded (as by welding or soldering) to a metal layer that has been deposited (as by plating, vapor deposition or sputtering) onto a surface of the crystal, a measurable strain is induced in the crystal in the vicinity of the bond. It is believed that the strain induced in the crystal can be attributed primarily to the fact that the electrical connector, the metal surface layer and the crystal have different coefficients of thermal expansion. In the case of an isotropic crystal such as silicon, the strain induced in the crystal by the bonding procedure produces birefringence in the crystal with respect to an optic axis in the direction of the applied stress.

If a collimated beam of circularly polarized radiation is transmitted into the crystal, the birefringence of the crystal in the vicinity of the bond causes a change in the polarization of the beam. In general, the polarization of the beam is spatially changed from circular to elliptical as the beam passes through the birefringent crystal. The change in polarization of the beam is manifested as a change in a measurable function of the energy (e.g., the power) of the beam.

The magnitude of the change in polarization of the beam as the beam passes through the crystal is a measure of the magnitude of the birefringence produced in the crystal by the stress associated with the bonding procedure, which corresponds to the magnitude of the strain induced in the crystal by the bonding procedure. The magnitude of the strain induced in a crystal by the bonding procedure provides a measure of the strength of the bond connecting the electrical connector to the metallized surface of the crystal.

In general, bond strength (and therefore bond quality) increases monotonically in proportion to the magnitude of the strain induced in the crystal by the bonding procedure. There is an upper limit to the amount of stress that can be applied to any particular type of crystal, before the crystal shatters. However, within a range of stress that can be tolerated by the crystal, a measurement of the magnitude of the resulting strain induced in the crystal by the bonding procedure can provide a calibrated indication of the strength of the bond.

In a specific application of the present invention to the task of measuring the strength of a bond securing an electrical connector to a metallized surface of a crystal, a collimated beam of circularly polarized radiation of a wavelength to which the crystal is transparent (e.g., infrared radiation in a wavelength band from about 1 micron to about 6 microns in the case of a silicon crystal) is directed into the crystal along an optical path that extends through the crystal toward the metallized surface of the crystal in the vicinity of the bond. The beam, as it travels through the crystal toward the metallized surface, is an "incident beam" which impinges upon the metallized surface at substantially normal incidence. The metallized surface reflects the beam, which travels through the crystal as a "return beam" along the same optical path as the incident beam (but in the opposite direction).

The magnitude of the change from circular to elliptical polarization that the beam undergoes in passing through the crystal in both directions is related to the amount of birefringence produced in the crystal by the bonding procedure. Therefore, the elliptically polarized return beam, after leaving the crystal, is analyzed to produce a linearly polarized component whose magnitude is indicative of the change in polarization, which is indicative of the amount of birefringence produced in the crystal as a result of the strain induced by the bonding procedure. A function of the energy (e.g., the power) of the linearly polarized component of the return beam is compared with the same function of energy of the beam directed into the crystal. The ratio of the power of the linearly polarized component of the return beam to the power of the Q beam directed into the crystal provides a measure of the strength of the bond.

DESCRIPTION OF THE DRAWING

FIG. 1 is an idealized representation in greatly enlarged cross-sectional detail of a bond joining an electrical connector to a metallized surface portion of a crystal.

FIG. 2 is a schematic representation of a stress sensor according to the present invention for use in measuring the strength of the bond illustrated in FIG. 1.

FIG. 3 is a schematic representation of certain features of an alternative embodiment of the stress sensor of FIG. 2.

BEST MODE OF CARRYING OUT THE INVENTION

A fragmentary portion of a crystal device such as a silicon solar cell is schematically illustrated in FIG. 1. The solar cell comprises a silicon crystal 10 having a metallized surface 11, which typically comprises successive layers of different metals such as, e.g., aluminum, palladium, titanium and silver formed thereon by conventional techniques such as plating, vapor deposition or sputtering. An electrical connector 12, typically a copper tab, is metallurgically bonded (as by welding) to the metallized surface 11. The bonding procedure produces a bond 13, which is a region in which material from the electrical connector 12 interpenetrates material from the metallized surface 11 to form an electrically conductive connection between the electrical connector 12 and the metallized surface 11.

The procedure by which the bond 13 is formed causes mechanical stress to be applied to the metallized surface 11 and to the crystal 10 due to differences between the coefficients of thermal expansion of the electrical connector 12, the metallized surface 11 and the crystal 10. In general, the strength of the bond 13 is proportional to the extent of interpenetration between material from the electrical connector 12 and material from the metallized surface 11, which in turn is proportional to the amount of strain induced in the crystal 10 by the mechanical stress due to the bonding procedure. The amount of strain induced in the crystal 10 by the bonding procedure is therefore a measure of the strength of the bond 13.

In a typical manufacturing process in which the present invention could be used, the crystal 10 as shown in FIG. 1 represents an individual silicon solar cell in an array of solar cells. In solar cell arrays used for certain applications, the bond 13 associated with each individual solar cell might be required not only to provide an electrically conductive path between the electrical connector 12 and the metallized surface 11, but also to serve as a structural support for the solar cell. For solar cell arrays used in satellite applications, the bond 13 would also be subjected to launch and orbital stresses. Consequently, in such applications, a quantitative measurement of the strength of each bond 13 would be needed to ensure that the bond 13 meets structural specifications.

A stress sensor according to the present invention is illustrated schematically in FIG. 2. In operation, the apparatus shown in FIG. 2 provides a quantitative measurement of the strength of the bond 13 between the electrical connector 12 and the metallized surface 11 of the crystal 10. The crystal 10 is positioned on a support plate 20, which is made of a substantially stress-free material (typically a glass) that is transparent to electromagnetic radiation in a wavelength band for which the crystal 10 is transparent. An unmetallized surface of the crystal 10 lies directly in contact with the support plate 20, and a collimated beam of optical radiation of a wavelength to which the support plate 20 and the crystal 10 are substantially transparent is transmitted through the support plate 20 and through the crystal 10 as an incident beam impinging at substantially normal incidence upon the metallized surface 11. The incident beam is reflected from the metallized surface 11 back through the crystal 10 and through the support plate 20 as a return beam, which travels along the same optical path (but in the opposite direction) as the incident beam.

As shown in FIG. 2, an illuminating beam is produced by an illuminator 21, which is preferably a monochromatic laser. In the particular case in which the crystal 10 is silicon, the illuminator 21 is a device that generates a beam of infrared radiation whose wavelength is in a band from about 1 micron to 6 microns, which is the bandwidth for which silicon is transparent. Thus, where the crystal 10 is silicon, the illuminator 21 could conveniently be an Nd-YAG laser adjusted to produce an illuminating beam with a wavelength of either 1.064 microns or 1.318 microns. Use of a substantially monochromatic beam minimizes wavelength-dependent effects such as refractive dispersion.

The beam produced by the illuminator 21 is directed to a first beamsplitter 22, which divides the beam into a transmitted component and a reflected component. The transmitted component is passed by the first beamsplitter 22 to a first detector 23, which monitors the power of the illuminating beam. The first detector 23 may be a conventional photodetector sensitive to radiation of the wavelength emitted by the illuminator 21. An electrical signal generated by the first detector 23 is proportional to the power of the illuminating beam produced by the illuminator 21. The component of the illuminating beam reflected by the first beamsplitter 22 is directed through a circular polarizer 24 to an imaging system represented by an imaging lens 25. The circular polarizer 24 could be a linear polarizer in combination with a one-quarter wave retarder. The imaging lens 25 collimates the reflected component, and directs it along an optical path through the support plate 20 and through the crystal 10 so as to impinge as an incident beam upon the metallized surface 11 in the vicinity of the bond 13. The optical path is such that the incident beam impinges upon the metallized surface 11 at substantially normal incidence.

The circular polarizer 24 causes the beam directed through the support plate 20 toward the crystal 10 to have a polarization with rotational symmetry about the direction of propagation. However, when the beam enters into the crystal 10 and travels as an incident beam toward the metallized surface 11, the polarization of the incident beam is spatially changed because of birefringence produced in the crystal 10 by the formation of the bond 13. The incident beam is reflected by the metallized surface 11 as a return beam, which travels back through the crystal 10 and through the support plate 20 along the same optical path as the incident beam but in the opposite direction. As the return beam travels through the crystal 10 away from the metallized surface 11, the polarization of the return beam is further spatially changed due to birefringence in the crystal 10.

The return beam is out of phase with respect to the incident beam, because of a 180° phase change that occurs upon reflection at the metallized surface 11. However, since the phase change is the same for all orientations of polarization, the phase change is of no concern for purposes of the present invention. It is very significant, however, that the return beam is not circularly polarized as it leaves the crystal 10.

The birefringence produced in the crystal 10 by the procedure whereby the electrical connector 12 is bonded to the metallized surface 11 causes the component of the illuminating beam reflected by the first beamsplitter 22 to undergo a change in polarization when passing through the crystal 10 (as the incident beam) travelling toward the metallized surface 11, and to undergo a further change in polarization when passing through the crystal 10 (as the return beam) travelling away from the metallized surface 11. In general, the return beam emerges from the crystal 10 with an elliptical polarization. The elliptically polarized return beam passes through the imaging lens 25 and through the circular polarizer 24 after leaving the crystal 10 and the support plate 20.

The circular polarizer 24 adds a one-quarter wave retardation difference to orthogonal components of the return beam, and linearly polarizes the resulting beam. Hence, the circular polarizer 24 functions as an analyzer, which transmits a linearly polarized component of the return beam to the first beamsplitter 22. The power of the linearly polarized component of the return beam is related to the amount of change in polarization that is produced in the reflected component of the illuminating beam due to birefringence of the crystal 10 as the reflected component of the illuminating beam passes first in one direction and then in the opposite direction through the crystal 10. When there is no birefringence in the crystal 10 (i.e., when there is no applied stress), the power of the linearly polarized component of the return beam is zero.

The power of the linearly polarized component of the return beam transmitted by the circular polarizer 24 provides a measure of the amount of birefringence produced in the crystal 10 as a result of the formation of the bond 13. As illustrated in FIG. 2, a portion of the linearly polarized component of the return beam transmitted by the circular polarizer 24 is transmitted by the first beamsplitter 22 to a second beamsplitter 26. Another portion of the linearly polarized component of the return beam transmitted by the circular polarizer 24 is reflected by the first beamsplitter 22, but the reflected portion is of no concern for purposes of the present invention.

The second beamsplitter 26 transmits one portion and reflects another portion of the radiation transmitted by the first beamsplitter 22. The component of the radiation transmitted by the second beamsplitter 26 is focussed to an image plane by the imaging lens 25. A video camera tube 27 is located at the image plane of the imaging lens 25 to produce an image of the region of the metallized surface 11 that is illuminated by the incident beam. The image of the illuminated portion of the metallized surface 11 can be displayed on a video display 28, which provides a "stress picture" of the crystal 10 in the vicinity of the bond 13. Variations in brightness (i.e., the gray tones) of the stress picture correspond to local variations in strain induced in the crystal 10 by the bonding procedure. The shape of the stress picture generally indicates the distribution of the strain in the crystal 10.

The component of the radiation reflected by the second beamsplitter 26 is directed to a second detector 29, which likewise may be a conventional photodetector sensitive to radiation of the wavelength emitted by the illuminator 21. The second detector 29 generates an electrical signal, which is proportional to the power of the linearly polarized component of the return beam transmitted by the circular polarizer 24. The electrical signals generated by the detectors 23 and 29 serve as inputs to a ratiometer 30, which generates a signal indicating the ratio between the power of the illuminating beam produced by the illuminator 21 (i.e., the output of the detector 23) and the power of the linearly polarized component of the return beam (i.e., the output of the detector 29). The ratio signal generated by the ratiometer 30 is independent of fluctuations in the power of the illuminating beam produced by the illuminator 21, and indicates the relative power of the linearly polarized component of the return beam transmitted by the circular polarizer 24.

The circular polarizer 24 functioning as an analyzer transmits the power of the return beam in proportion to the amount of birefringence produced in the crystal 10 as a result of the procedure used to bond the electrical connector 12 to the metallized surface 11. The signal generated by the ratiometer 30, which can be displayed as a numerical value by a conventional display device 31, provides a quantitative measurement of the amount of strain induced in the crystal 10 by the bonding procedure. The numerical value generated by the ratiometer 30 is therefore a quantitative measurement of the strength of the bond 13. This measurement can readily be gain-calibrated to NBS-traceable standards (i.e., standards established by the U.S. National Bureau of Standards) to give reproducible results.

Gain-calibration of the output signal generated by the ratiometer 30 is accomplished by substituting a calibration cell for one of the solar cells that is to be tested for bond strength. The calibration cell comprises a one-quarter wave retarder made of a material (e.g., quartz) of calibrated optical retardation, and has substantially the same thickness as the solar cells to be tested. A low-reflectivity coating is provided on the surface of the calibration cell that lies in contact with the support plate 20, while no coating is provided on the opposite surface of the calibration cell. When the test procedure as described above for a solar cell is applied instead to the calibration cell, the incident beam passes through the calibration cell to the uncoated opposite surface, from which a predetermined portion of the incident beam (viz., approximately 4% in the case of quartz) is reflected back into the calibration cell as the return beam. The calibration cell causes a one-half wave retardation difference in the return beam with respect to the incident beam due to natural birefringence in the crystal. Measurement of induced strain in a solar cell can therefore be reproducibly calibrated in relative terms with respect to a convenient reference. The measurement can be extrapolated to units of, e.g., nanometers of retardation per centimeter in the field of view.

The ratiometer 30 can also generate an electrical signal, which can be used to drive a manufacturing control loop 32 for automatically controlling variables in the bonding procedure that effect the strength of the bonds 13 that are produced in the manufacture of, e.g., solar cell arrays. The components and operation of the manufacturing control loop 32 may be conventional. The signal generated by the ratiometer 30 could also be used to drive a means for statistical process control. In a particular application, the signal generated by the ratiometer 30 could be used for quality assurance inspection only.

Additional information relating to the strength of the bond 13 could be gleaned by a practitioner skilled in the art from an analysis of the image of the illuminated portion of the metallized surface 11 (i.e., the "stress picture") in the vicinity of the bond 13. Thus, in an alternative embodiment of the invention as shown in FIG. 3, the image received by the video camera tube 27 could be digitized and processed by means of a computer processor 33. The output of the computer processor 33 could be used to drive the manufacturing control loop 32, and could be displayed by a conventional display device 34. The output of the video camera tube 27 could also be recorded by a conventional video recorder device 35 for future reference.

The present invention has been described above with respect to a particular embodiment. However, other embodiments within the scope of the invention would be apparent to practitioners in the art upon perusal of the foregoing description and the accompanying drawing. Therefore, the description and drawing are to be deemed as merely illustrative of the invention, which is legally defined by the following claims and their equivalents.

We claim:

1. A method for measuring quality of a bond by which a metal connector is secured to metallized surface of a crystal, said method comprising the steps of:
   (a) dividing an illuminating beam of electromagnetic radiation of a wavelength to which said crystal is substantially transparent into a first component and a second component;
   (b) obtaining a measurement of magnitude of power of said first component of said illuminating beam, said measurement of magnitude of power of said first component of said illuminating beam having random temporal variations due to random temporal changes occurring in said illuminating beam;
   (c) circularly polarizing said second component of said illuminating beam, said second component of said illuminating beam passing into said crystal as a substantially circularly polarized incident beam that travels through said crystal so as to impinge upon said metallized surface, said second component of said illuminating beam being reflected by said metallized surface as a return beam that travels back through said crystal, said second component of said illuminating beam under going a change from circular polarization to elliptical polarization when passing through said crystal, said change in polarization being due to birefringence produced in said crystal by said bond;
   (d) obtaining a measurement of magnitude of power of a linearly polarize component of said return beam, said measurement of magnitude of power of said linearly polarized component of said return beam having random temporal variations that are proportional to said random temporal variations of said measurement of magnitude of power of said first component of said illuminating beam; and
   (e) forming a ratio of the measurement of magnitude of power of said first component of said illuminating beam to the measurement of magnitude of power of said linearly polarized component of said return beam, said ratio being a measurement of the quality of said bond.

2. The method of claim 1 wherein the step of obtaining said measurement of magnitude of power of said first component of said illuminating beam is accomplished by photodetector means.

3. The method of claim 2 wherein the step of obtaining said measurement of magnitude of power of said linearly polarized component of said return beam analyzing said return beam to obtain said linearly polarized component of said return measuring power of said linearly polarized component of said is accomplished by photodetector means.

4. The method of claim 3 wherein the step of obtaining said measurement of magnitude of power of said linearly polarized component of said return beam comprises:
   (a) adding a one-quarter wave retardation difference to orthogonal components of said return beam; and
   (b) linearly polarizing the orthogonal components retarded with said one-quarter wave retardation difference, thereby producing said linearly polarized component of said return beam for which said measurement of magnitude of power is obtained.

5. The method of claim 3 wherein the step of forming said ratio of the measurement of magnitude of power of said first component of said illuminating beam to the measurement of magnitude of power of said linearly polarized component of said return beam further comprises calibrating said ratio in terms of a reference to obtain a reproducible measurement of the quality of said bond.

6. The method of claim 5 wherein said ratio is calibrated by:
   (a) substituting a standard of known optical birefringence in place of said crystal, a first surface of said standard being coated so as to have only insignificant reflectivity, an opposite surface of said standard having a predetermined reflectivity such that a predetermined portion of said illuminating beam passing through said first surface into said standard is reflected by said opposite surface back into said standard, orthogonal components of said illuminating beam acquiring a one-half wave retardation difference in passing through said standard; and
   (b) adjusting said ratio to a convenient value relative to a reference value.

7. The method of claim 1 comprising the further step of collimating said second component of said illuminating beam.

8. The method of claim 7 wherein said incident beam is directed as a collimated beam along an optical path through said crystal so as to impinge upon said metallized surface at substantially normal incidence, said return beam travelling back through said crystal substantially along said optical path.

9. The method of claim 1 comprising the further step of focussing said linearly polarized component of said return beam on an image plane to provide a visual representation of said change from circular polarization to elliptical polarization that occurs in said first component of said illuminating beam in passing through said crystal, said change in polarization being indicative of the quality of said bond.

10. An apparatus for measuring quality of a bond by which a metal connector is secured to a metallized surface of a crystal, said apparatus comprising:
   (a) means for generating an illuminating beam of optical radiation of a wavelength to which said crystal is substantially transparent;
   (b) means for dividing said illuminating beam into a first component an a second component;
   (c) means for obtaining a measurement of magnitude of power of said firs component of said illuminating beam, said measurement of magnitude of power of said first component of said illuminating beam having random temporal variations due to random temporal changes occurring in said illuminating beam;
   (d) means for circularly polarizing said second component of said illuminating beam and for passing said second component of said illuminating beam into said crystal as a substantially circularly polarized incident beam that travels through said crystal so as to impinge upon said metallized surface, said second component being reflected by said metallized surface as a return beam that travels back through said crystal, said second component of said illuminating beam undergoing a change from circular polarization to elliptical polarization when passing through said crystal, said change in polarization being due to birefringence produced in said crystal by said bond;

(e) means for obtaining a measurement of magnitude of power of a linearly polarized component of said return beam, said measurement of magnitude of power of said linearly polarized component of said return beam having random temporal variations that are proportional to said random temporal variations of said measurement of magnitude of power of said first component of said illuminating beam; and (f) means for forming a ratio of the measurement of magnitude of power said first component of said illuminating beam to the measurement of magnitude of power of said linearly polarized component of said return beam, said ratio being a measurement of the quality of said bond.

11. The apparatus of claim 10 wherein said means for generating said illuminating beam comprises a monochromatic laser.

12. The apparatus of claim 9 wherein said means for obtaining said measurement of magnitude of power of said first component of said illuminating beam comprises photodetector means.

13. The apparatus of claim 11 wherein said means for circularly polarizing said second component of said illuminating beam comprises a one-quarter wave retarder and a linear polarizer, said means for circularly polarizing said second component of said illuminating beam thereby serving to analyze said return beam so as to produce said linearly polarized component of said return beam, said means for obtaining said measurement of magnitude of power of said linearly polarized component of said return beam comprising photodetector means.

14. The apparatus of claim 12, wherein said means for forming said ratio of the measurement of magnitude of power of said first component of said illuminating beam to the measurement of magnitude of power of said linearly polarized component of said return beam comprises means for calibrating said ratio in terms of a reference to obtain a reproducible measure of the quality of said bond.

15. The apparatus of claim 10 further comprising means for collimating said second component of said illuminating beam.

16. The apparatus of claim 15 wherein said second component of said illuminating beam is directed as a collimated beam along an optical path through said crystal so as to impinge upon said metallized surface at substantially normal incidence, said return beam travelling back through said crystal substantially along said optical path.

17. The apparatus of claim 10 further comprising means for converting a portion of said linearly polarized component of said return beam into a visual display of a region of said metallized surface of said crystal that has been illuminated by said second component of said illuminating beam, said visual display indicating distribution and local variations of strain induced in said crystal by said bond.

* * * * *